(12) United States Patent
Lan et al.

(10) Patent No.: US 7,710,844 B2
(45) Date of Patent: May 4, 2010

(54) OPTICAL STORAGE SYSTEM

(75) Inventors: Yung-Sung Lan, Kaohsiung County (TW); Chih-Ming Lin, Taichung (TW); Tzuan-Ren Jeng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 633 days.

(21) Appl. No.: 11/616,785

(22) Filed: Dec. 27, 2006

(65) Prior Publication Data

US 2008/0106994 A1    May 8, 2008

(30) Foreign Application Priority Data

Nov. 7, 2006    (TW) .............................. 95141154 A

(51) Int. Cl.
*G11B 7/00* (2006.01)
(52) U.S. Cl. .................................................... 369/103
(58) Field of Classification Search .................. None
See application file for complete search history.

(56) References Cited

U.S. PATENT DOCUMENTS 5,726,962 A * 3/1998 Okada et al. ............ 369/44.23

| 2004/0067419 | A1* | 4/2004 | Mizushima | 430/1 |
| 2004/0212859 | A1* | 10/2004 | Tsukagoshi | 359/15 |
| 2005/0141388 | A1* | 6/2005 | Yamatsu | 369/103 |
| 2006/0176532 | A1 | 8/2006 | Toishi | |

FOREIGN PATENT DOCUMENTS

TW          220926 B        9/2004

* cited by examiner

*Primary Examiner*—Thang V Tran
*Assistant Examiner*—Brian Butcher
(74) *Attorney, Agent, or Firm*—Quintero Law Office

(57) ABSTRACT

An optical storage system for storing data in an optical medium comprises an initial light source, a first sheet, a light modulator and a second sheet. The initial light source provides an initial light beam. The first sheet comprises a first surface and a second surface, wherein the initial light beam is partially reflected on the first surface to act as a reference beam, and the initial light beam partially passes the first surface, reflected on the second surface to act as a signal beam. The light modulator provides a pattern, wherein the signal beam contacts the light modulator. The second sheet comprises a third surface and a fourth surface, wherein the reference beam is reflected toward the optical medium on the third surface, the signal beam is reflected toward the optical medium on the fourth surface, and the reference beam and the signal beam interfere with each other to store the pattern into the optical medium.

16 Claims, 13 Drawing Sheets

OPTICAL STORAGE SYSTEM

BACKGROUND OF THE INVENTION

1. Field of the Invention

The invention relates to optical storage and in particular to a simplified holographic data storage system.

2. Description of the Related Art

Holographic data storage technology utilizes a reference beam and a signal beam interfering with each other to store high density data into an optical medium. The signal beam passes a light modulator, and the light modulator maps a two dimensional pattern to the signal beam. FIG. 1 shows a conventional holographic data storage system 1, comprising a light source 11, a light source 12, a digital micromirror element 20, a beam splitter 30, reflectors 41-49, a sensor 51, a sensor 52, a lens 61, a lens 62 and a polarizer 63. The holographic data storage system 1 stores two dimensional patterns into optical medium 70. In the holographic data storage system 1, a large number of beam splitters and reflectors are utilized to guide the reference beam and the signal beam. Thus, the cost of conventional holographic data storage systems increases, the light path thereof is longer, the volume thereof increases, and noise is generated.

BRIEF SUMMARY OF THE INVENTION

A detailed description is given in the following embodiments with reference to the accompanying drawings.

An optical storage system for storing data in an optical medium comprises an initial light source, a first sheet, a light modulator and a second sheet. The initial light source provides an initial light beam. The first sheet comprises a first surface and a second surface, wherein the initial light beam is partially reflected on the first surface to act as a reference beam, and the initial light beam partially passes the first surface, reflected on the second surface to act as a signal beam. The light modulator provides a pattern, wherein the signal beam contacts the light modulator. The second sheet comprises a third surface and a fourth surface, wherein the reference beam is reflected toward the optical medium on the third surface, the signal beam is reflected toward the optical medium on the fourth surface, and the reference beam and the signal beam interfere with each other to store the pattern into the optical medium.

The invention utilizes the first and second sheets to replace conventional reflectors. Thus, the optical elements of the holographic data storage system are reduced, and cost and volume thereof are decreased.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
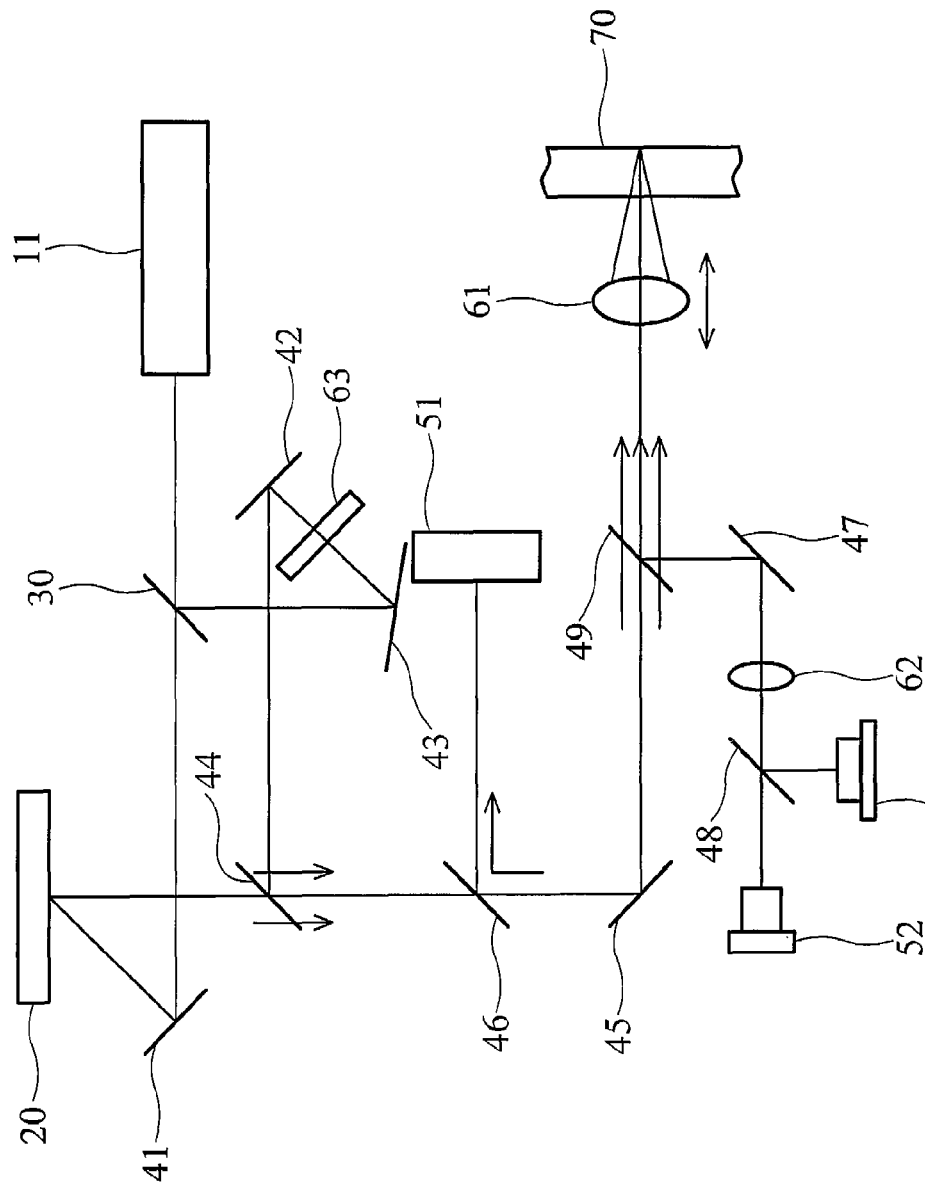
FIG. 1 shows a conventional holographic data storage system.
Figure 2A:
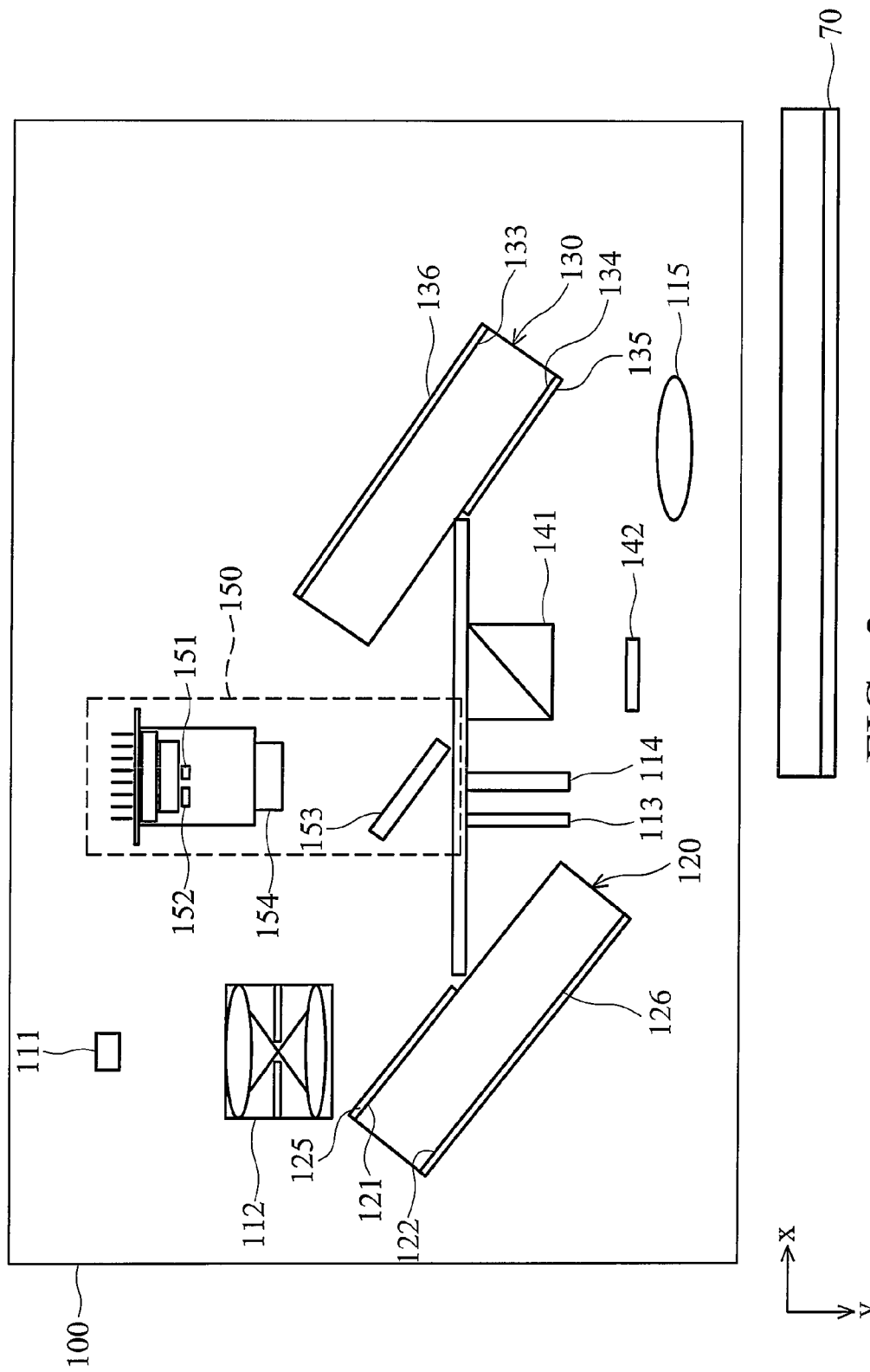
FIG. 2a shows a holographic data storage system of a first embodiment of the invention.

FIG. 2a shows a holographic data storage system 100 of a first embodiment of the invention, comprising an initial light source 111, a filtering-expanding unit 112, a shutter 113, a light modulator 114, a lens 115, a first sheet 120, a second sheet 130, a beam splitter 141, an image sensor 142 and a servo unit 150. The holographic data storage system 100 reads data from an optical medium 70 and writes data thereto.

The first sheet 120 comprises a first surface 121 and a second surface 122. The second sheet 130 comprises a third surface 133 and a fourth surface 134. The first sheet 120 and the second sheet 130 are glass. The light modulator 114 is a space light modulator providing data pattern.

Figure 2B:
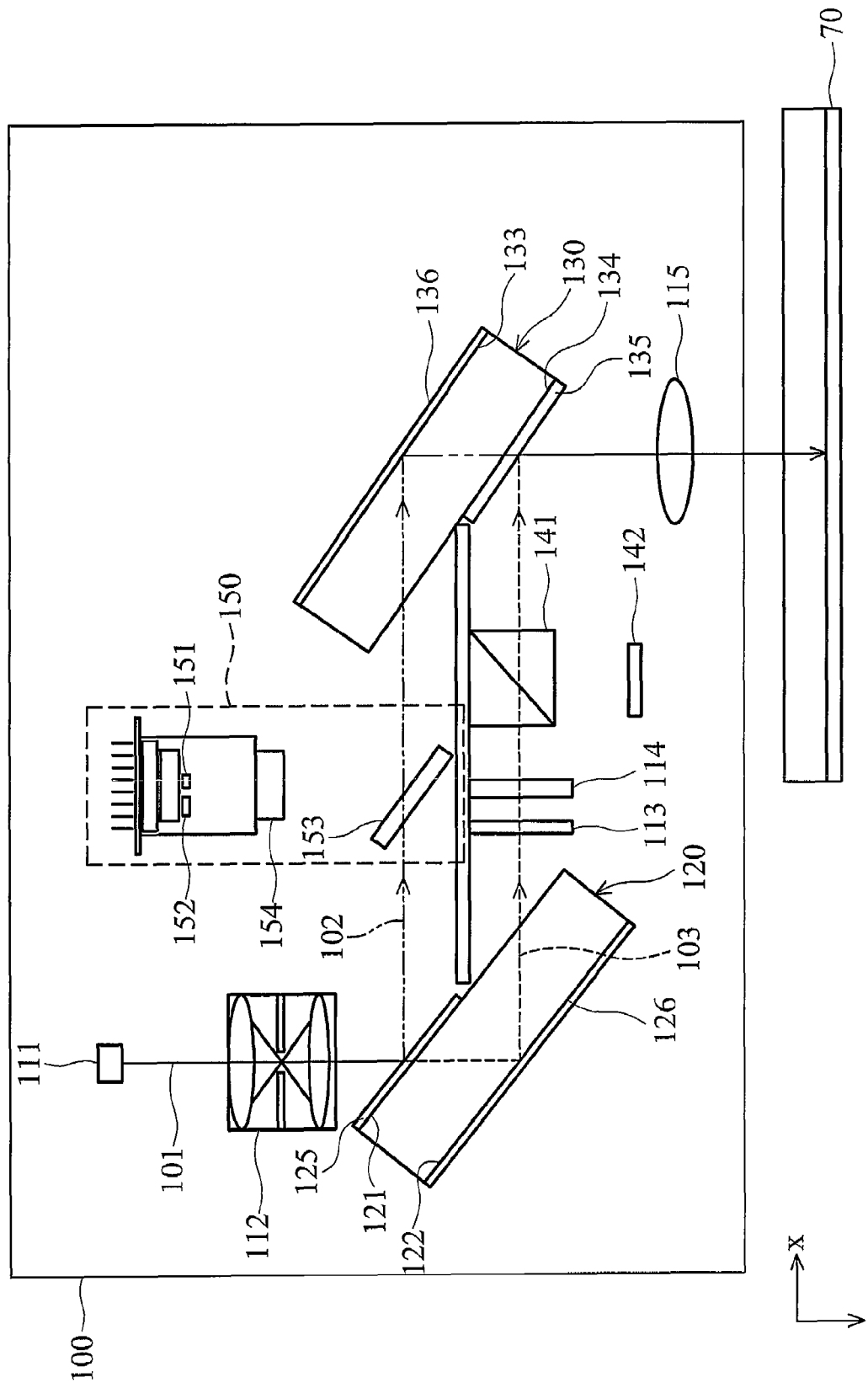
FIG. 2b shows the holographic data storage system of the first embodiment writing data to an optical medium.

As shown in FIG. 2b, when the holographic data storage system 100 writes data to the optical medium 70, the initial light source 111 provides an initial light beam 101. The initial light beam 101 passes the filtering-expanding unit 112, and is partially reflected on the first surface 121 to act as a reference beam 102. Then, the reference beam 102 is reflected on the third surface 133 toward the optical medium 70. The initial light beam 101 partially passes the first surface 121, and is reflected on the second surface 122 to act as a signal beam 103. The signal beam 103 passes the shutter 113, the light modulator 114 and the beam splitter 141, and is reflected on the fourth surface 134 toward the optical medium 70. The reference beam 102 and the signal beam 103 interfere with each other to store the pattern to the optical medium 70.

In the FIG. 2b, the signal beam 103 and the reference beam 102 are simplified as single lines.

The invention utilizes the first and second sheets to replace conventional reflectors. Thus, the optical elements of the holographic data storage system are reduced, and the cost and volume thereof are decreased.

Figure 2C:
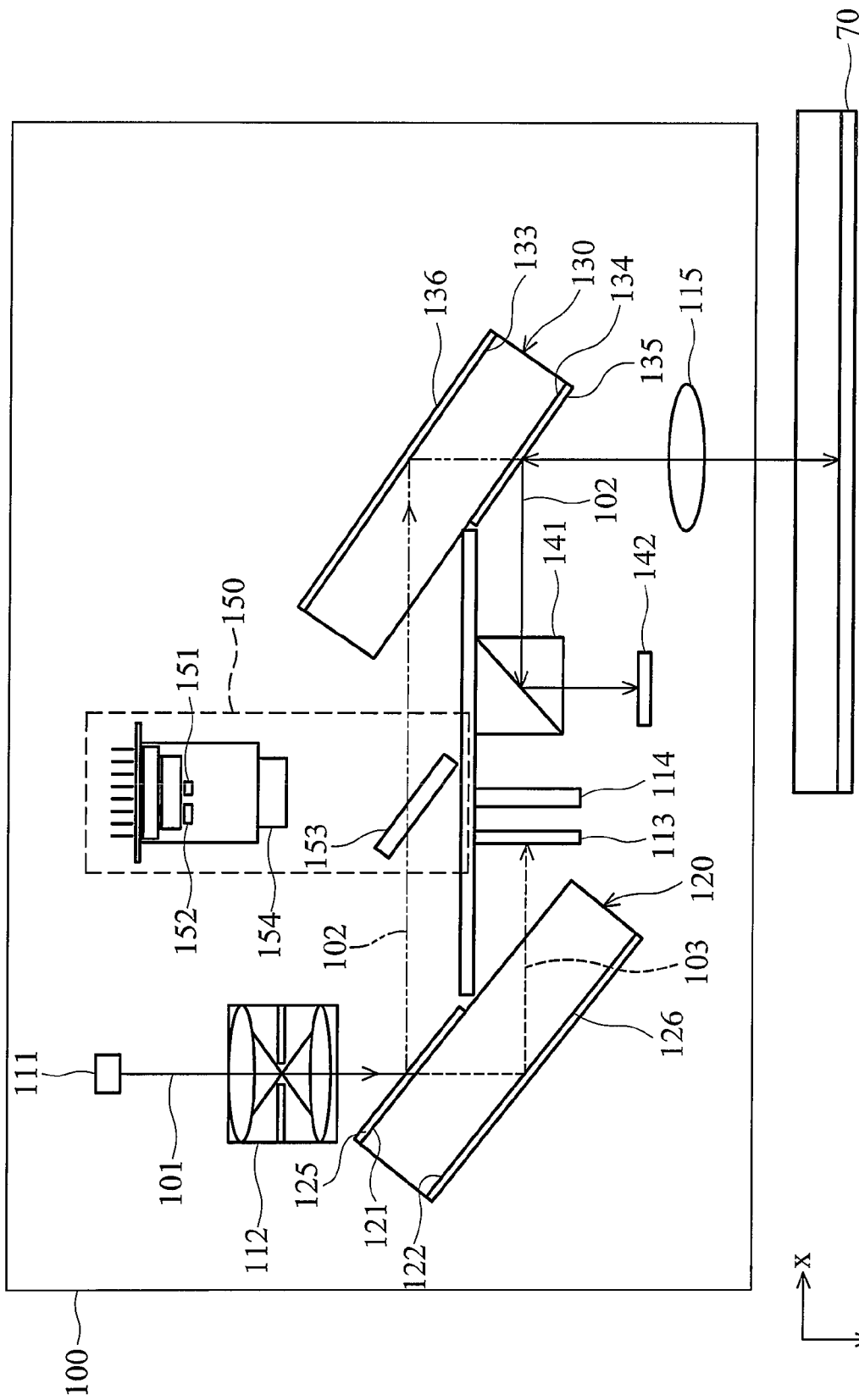
FIG. 2c shows the holographic data storage system of the first embodiment reading data from the optical medium.

As shown in FIG. 2c, when the holographic data storage system 100 reads the optical medium 70, the signal beam 103 is interrupted by the shutter 113. The reference beam 102 contacts the optical medium 70, recovering the data pattern stored therein, reflected toward the fourth surface 134, reflected by the fourth surface 134 toward the beam splitter 141, and guided to the image sensor 142 by the beam splitter 141. Thus, the data pattern is received by the image sensor 142.

Figure 2D:
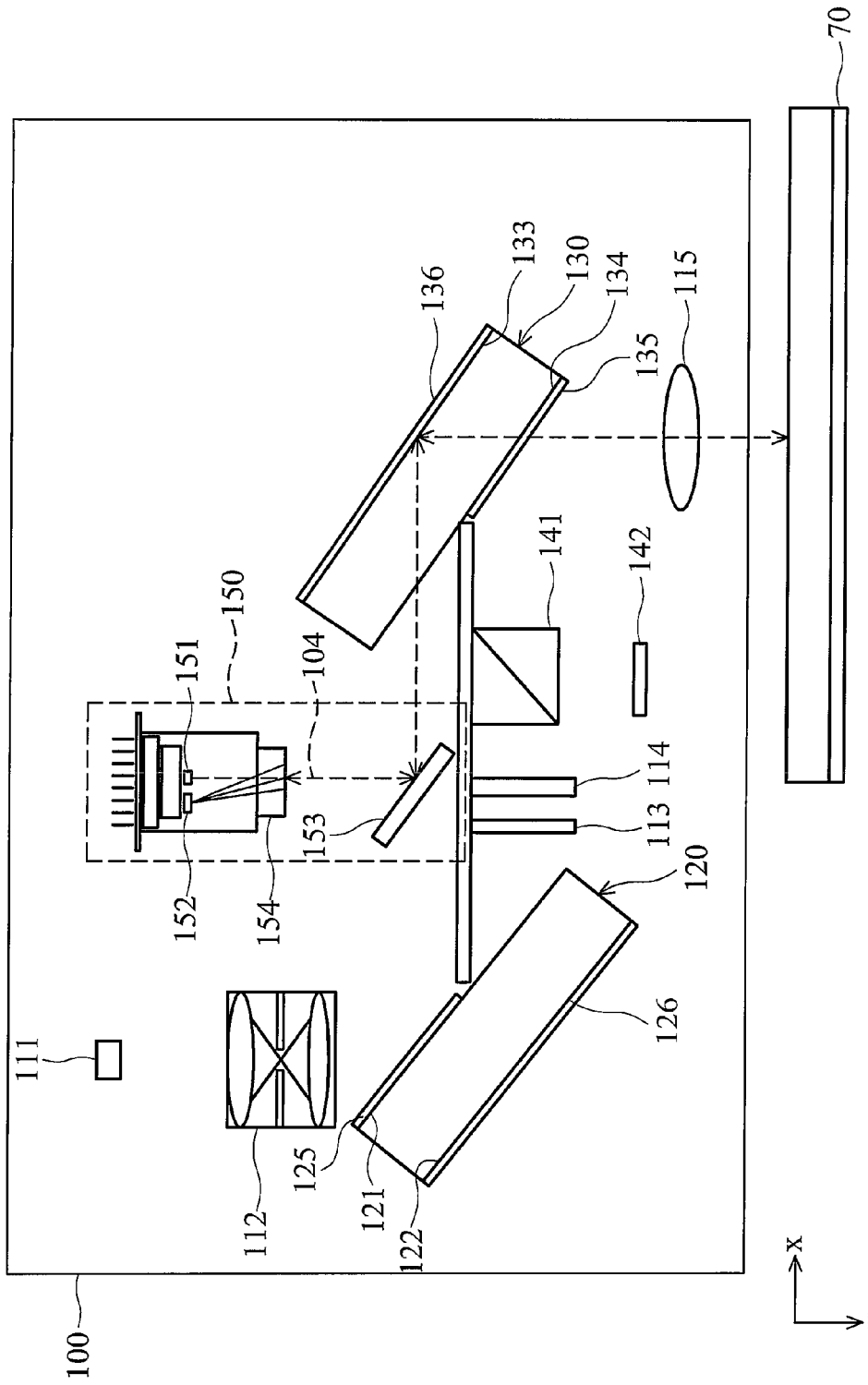
FIG. 2d shows the holographic data storage system of the first embodiment performing a servo process.

As shown in FIG. 2d, the servo unit 150 is a holographic servo unit, comprising a servo light source 151, an optical sensor 152, a dichroic mirror 153 and a holographic optical element 154. When the holographic data storage system 100 performs a servo process, the servo light source 151 provides a servo light beam 104, reflected by the dichroic mirror 153, and the third surface 133, passing the lens 115, modulated by servo grooves of the optical medium 70, and is reflected thereby. Then, the servo light beam 104 travels along original path back to the servo unit 150, and guided by the holographic optical element 154 to the optical sensor 152. The holographic data storage system 100 performs the focus servo and seek servo by the servo unit 150.

The initial light beam 101 travels in a first direction y, and the reference beam 102 and the signal beam 103 are reflected on the first sheet 120 toward a second direction x perpendicular to the first direction y. Then, the reference beam 102 and the signal beam 103 are reflected on the second sheet 130, and travel in the first direction y.

The first sheet 120 is parallel to the second sheet 130. An included angle between the first sheet and the first direction y is 45°.

The first sheet 120 further comprises a first optical film 125 and a first reflective layer 126, the first optical film 125 formed on the first surface 121, and the first reflective layer 126 formed on the second surface 122. The second sheet 130 further comprises a second optical film 135 and a second reflective layer 136, the second optical film 135 is formed on the fourth surface 134, and the second reflective layer 136 is formed on the third surface 133. The first optical film 125 is partially formed on the first surface 121, and the second optical film 135 is partially formed on the fourth surface 134.

The first optical film 125 and the second optical film 135 can be passable films. In an embodiment, when a light beam contacts the first optical film 125 or the second optical film 135, the first optical film 125 and the second optical film 135 provide 50% transmission and 50% reflection.

The initial light beam 101 is partially reflected by the first optical film 125 to act as the reference beam 102, and the initial light beam 101 partially passes the first optical film 125, reflected by the first reflective layer 126 to act as the signal beam 103. The reference beam 102 is reflected toward the optical medium 70 by the second reflective layer 136 passing the lens 115, the signal beam 103 is reflected toward the optical medium 70 by the second optical film 135 passing the lens 115, and the reference beam 102 and the signal beam 103 interfere with each other to store the pattern into the optical medium 70.

As shown in FIGS. 2b and 2c, when the reference beam 102 passes the second optical film or is reflected thereby, optical energy is lost. However, the energy lost does not affect the writing and reading of the holographic data storage system 100. As shown in FIG. 2d, when the servo light beam 104 passes the second optical film 135, optical energy is lost. However, the energy lost does not deteriorate the operation of the servo unit 150. In the invention, the first and second optical films are selected and designed to reduce energy loss.

FIGS. 3a-3d show a holographic data storage system 100' of a second embodiment of the invention, wherein a reflective light modulator 114' is disposed on the second surface 122. The signal beam 103 passes the first surface 121 and is reflected by the reflective light modulator 114'. The reflective light modulator 114' can be a digital micromirror element.

Figure 3A:
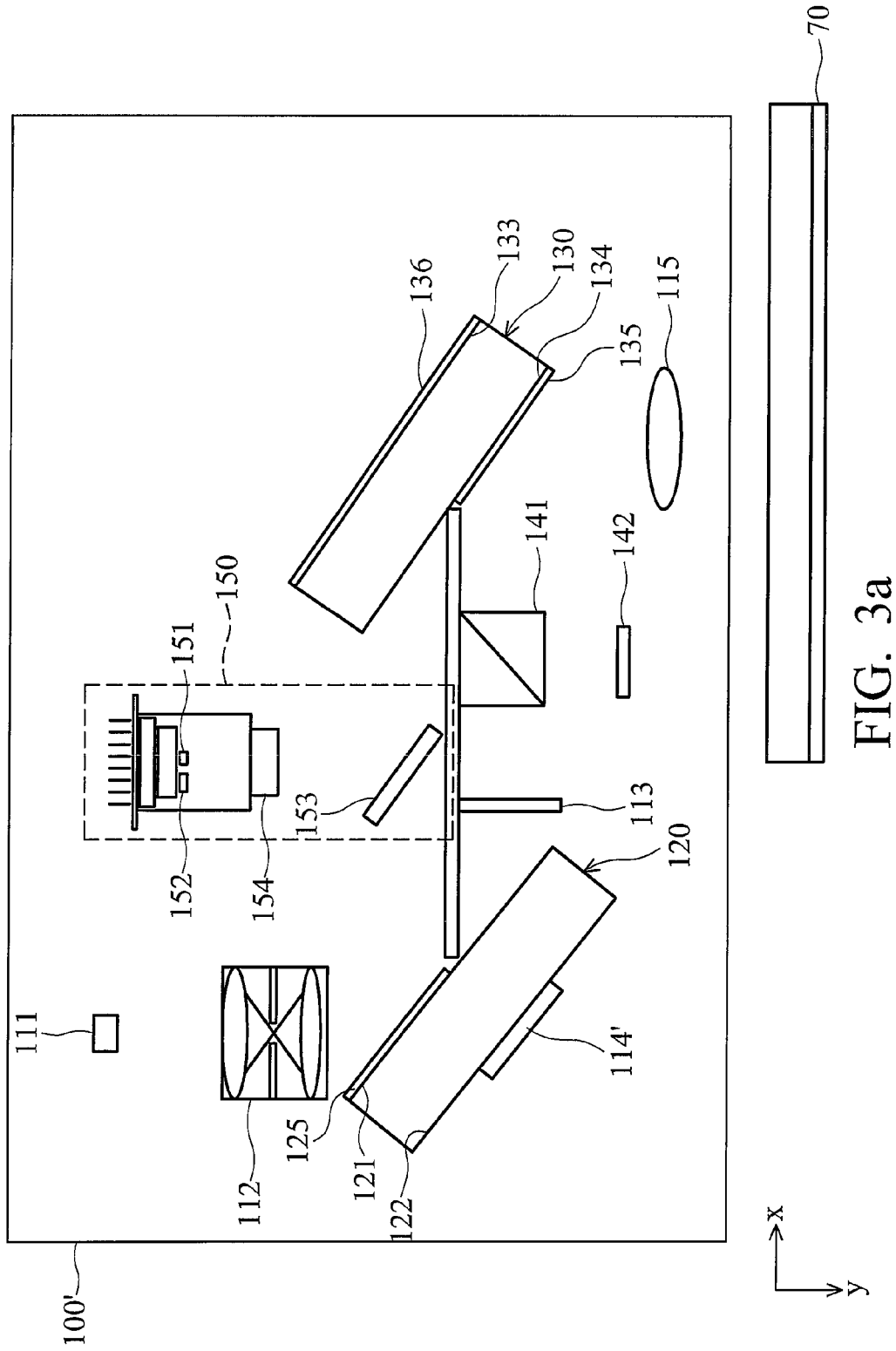
FIG. 3a shows a holographic data storage system of a second embodiment of the invention.

FIG. 3a shows the holographic data storage system 100' of the second embodiment of the invention, comprising an initial light source 111, a filtering-expanding unit 112, a shutter 113, a reflective light modulator 114', a lens 115, a first sheet 120, a second sheet 130, a beam splitter 141, an image sensor 142 and a servo unit 150. The holographic data storage system 100' reads data from an optical medium 70 and writes data thereto.

The first sheet 120 comprises a first surface 121 and a second surface 122. The second sheet 130 comprises a third surface 133 and a fourth surface 134. The first sheet 120 and the second sheet 130 are glass. The reflective light modulator 114' is a space light modulator providing data pattern.

Figure 3B:
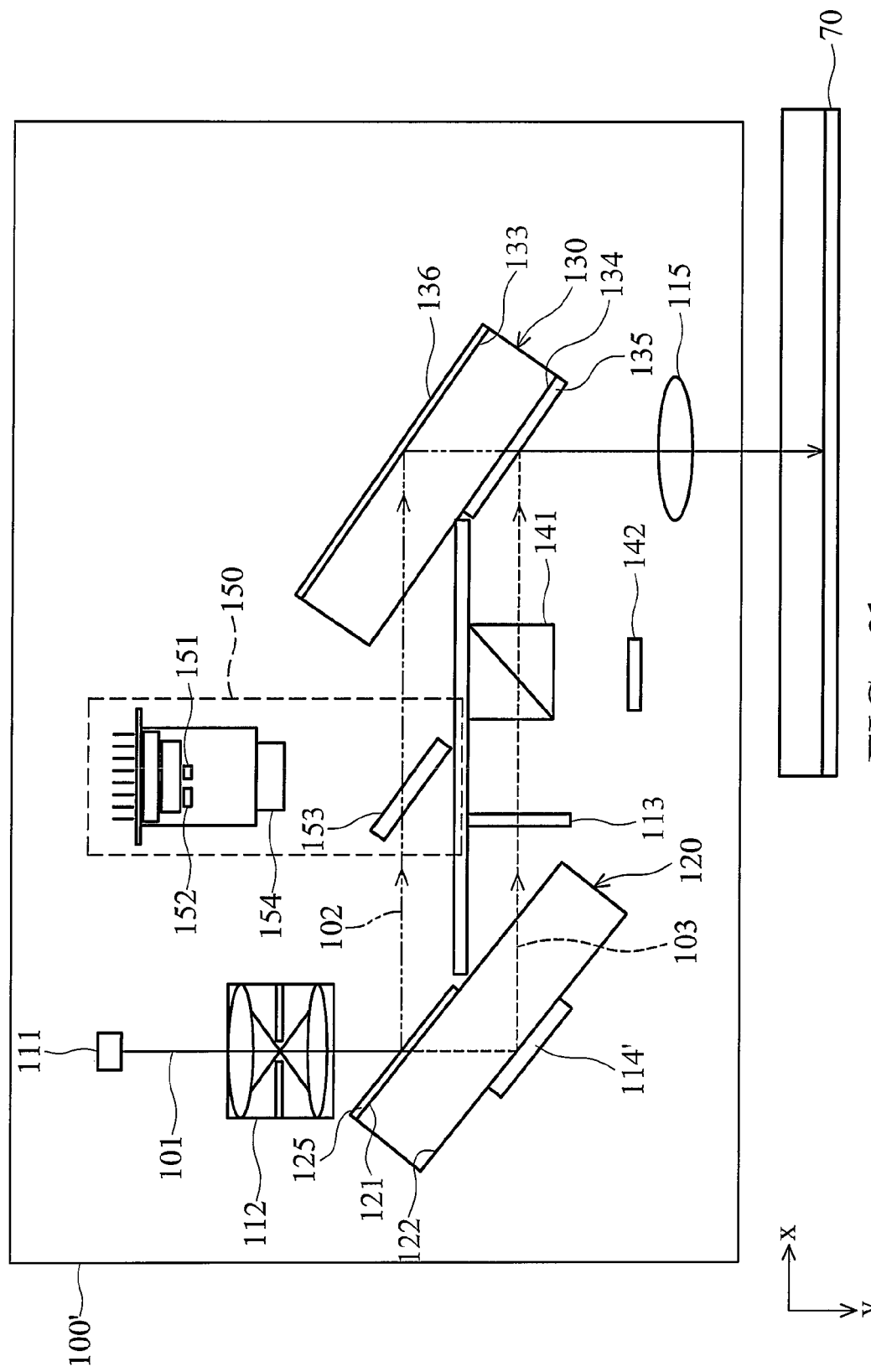
FIG. 3b shows the holographic data storage system of the second embodiment writing data to an optical medium.

As shown in FIG. 3b, when the holographic data storage system 100' writes data to the optical medium 70, the initial light source 111 provides an initial light beam 101. The initial light beam 101 passes the filtering-expanding unit 112, and is partially reflected on the first surface 121 to act as a reference beam 102. Then, the reference beam 102 is reflected on the third surface 133 toward the optical medium 70. The initial light beam 101 partially passes the first surface 121, and is reflected on the reflective light modulator 114' to act as a signal beam 103. The signal beam 103 passes the shutter 113 and the beam splitter 141, and is reflected on the fourth surface 134 toward the optical medium 70. The reference beam 102 and the signal beam 103 interfere with each other to store the pattern into the optical medium 70.

In the FIG. 3b, the signal beam 103 and the reference beam 102 are simplified as single lines.

The invention utilizes the first and second sheets to replace conventional reflectors. Thus, the optical elements of the holographic data storage system are reduced, and the cost and volume thereof are decreased.

Figure 3C:
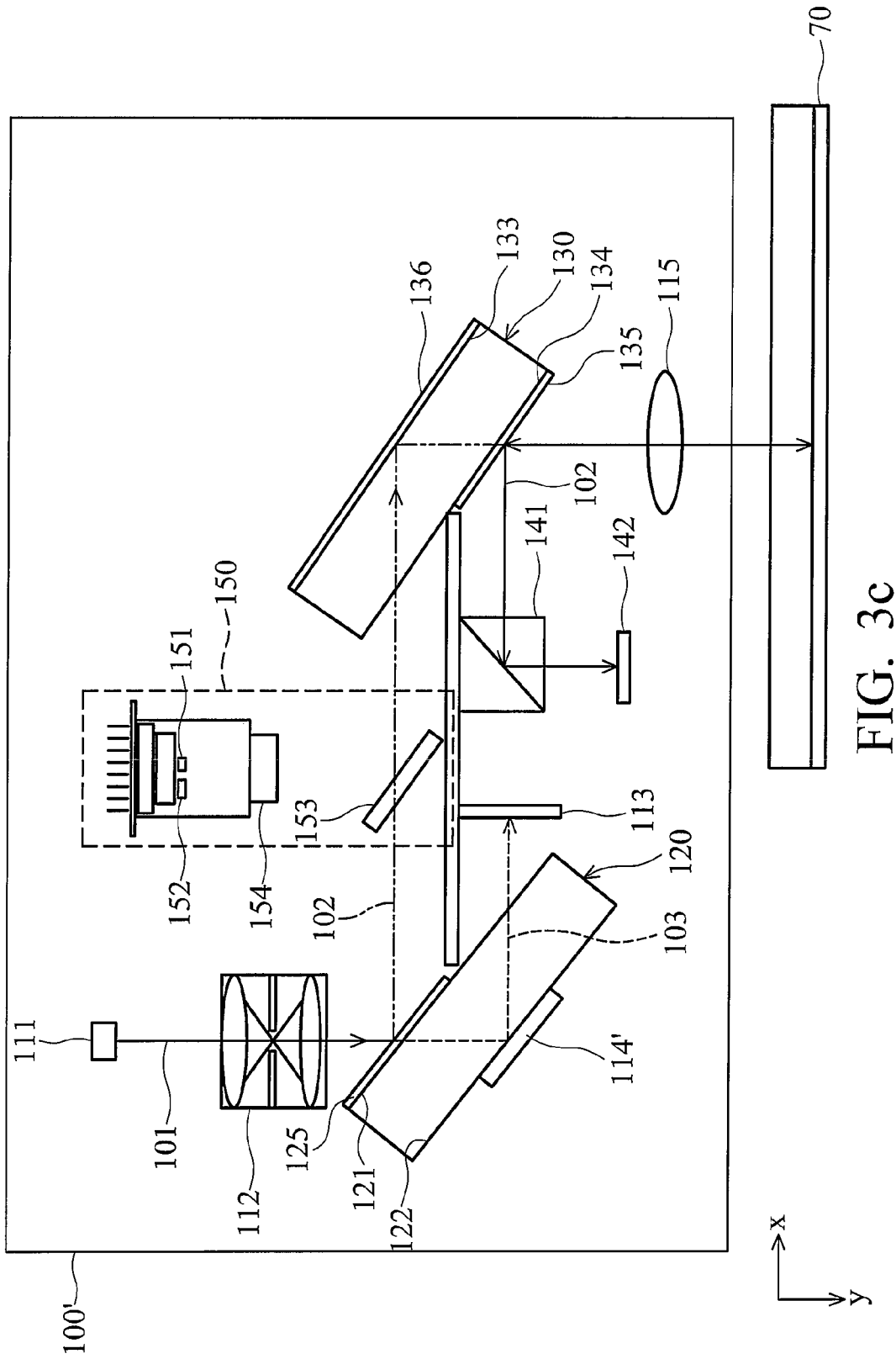
FIG. 3c shows the holographic data storage system of the second embodiment reading data from the optical medium.

As shown in FIG. 3c, when the holographic data storage system 100 reads the optical medium 70, the signal beam 103 is interrupted by the shutter 113. The reference beam 102 contacts the optical medium 70, recovering the data pattern stored therein, reflected toward the fourth surface 134, reflected by the fourth surface 134 toward the beam splitter 141, and guided to the image sensor 142 by the beam splitter 141. Thus, the data pattern is received by the image sensor 142.

Figure 3D:
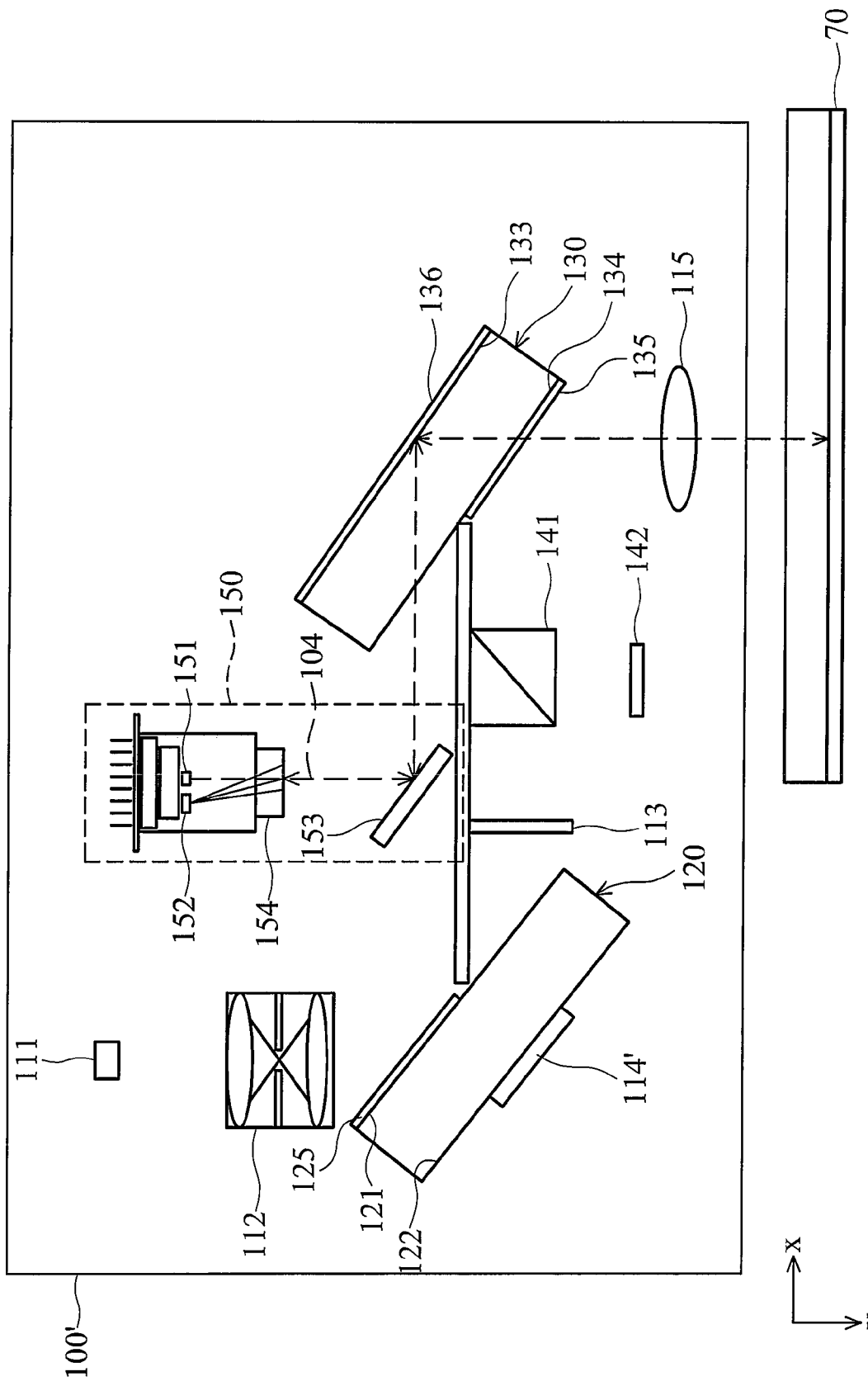
FIG. 3d shows the holographic data storage system of the second embodiment performing a servo process.

As shown in FIG. 3d, the servo unit 150 comprises a servo light source 151, an optical sensor 152, a dichroic mirror 153 and a holographic optical element 154. When the holographic data storage system 100' performs a servo process, the servo light source 151 provides a servo light beam 104, reflected by the dichroic mirror 153 and the third surface 133, passing the lens 115, modulated by servo grooves of the optical medium 70, and is reflected thereby. Then, the servo light beam 104 travels along original path back to the servo unit 150, and guided by the holographic optical element 154 to the optical sensor 152. The holographic data storage system 100' performs the focus servo and seek servo by the servo unit 150.

The initial light beam 101 travels in a first direction y, and the reference beam 102 and the signal beam 103 are reflected on the first sheet 120 and the reflective light modulator 114' toward a second direction x perpendicular to the first direction y. Then, the reference beam 102 and the signal beam 103 are reflected on the second sheet 130, and travel in the first direction y.

The first sheet 120 is parallel to the second sheet 130. An included angle between the reflective light modulator 114' and the first direction y is 45°.

The first sheet 120 further comprises a first optical film 125, and the first optical film 125 is formed on the first surface 121. The second sheet 130 further comprises a second optical film 135 and a second reflective layer 136, the second optical film 135 is formed on the fourth surface 134, and the second reflective layer 136 is formed on the third surface 133. The first optical film 125 is partially formed on the first surface 121, and the second optical film 135 is partially formed on the fourth surface 134.

The first optical film 125 and the second optical film 135 can be passable films. In an embodiment, when a light beam contacts the first optical film 125 or the second optical film 135, the first optical film 125 and the second optical film 135 provide 50% transmission and 50% reflection.

The initial light beam 101 is partially reflected by the first optical film 125 to act as the reference beam 102, and the initial light beam 101 partially passes the first optical film 125, reflected by the reflective light modulator 114' to act as the signal beam 103. The reference beam 102 is reflected toward the optical medium 70 by the second reflective layer 136 passing the lens 115, the signal beam 103 is reflected toward the optical medium 70 by the second optical film 135 passing the lens 115, and the reference beam 102 and the signal beam 103 interfere with each other to store the pattern into the optical medium 70.

Figure 4A:
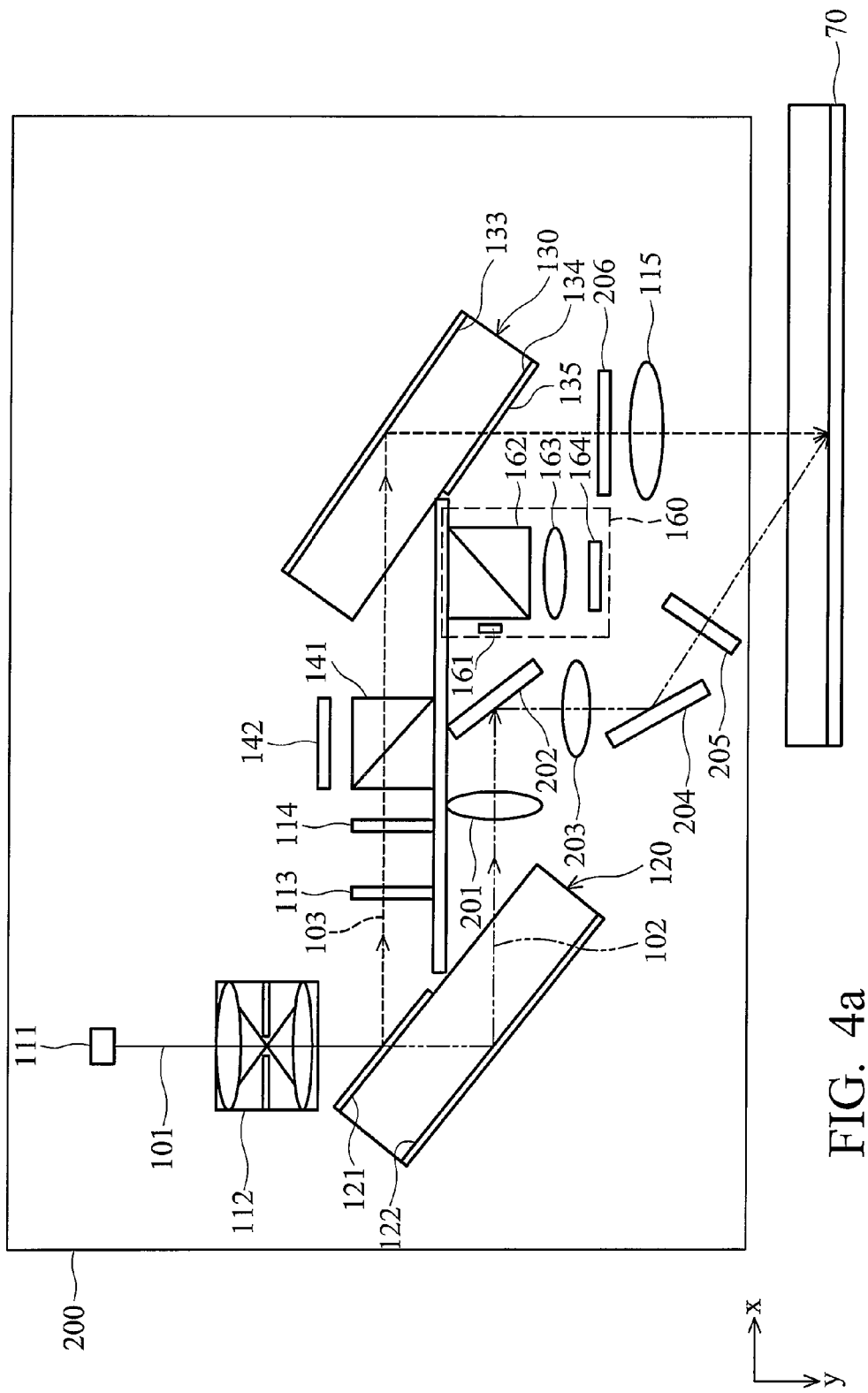
FIG. 4a shows a holographic data storage system of a third embodiment writing data to an optical medium.
Figure 4B:
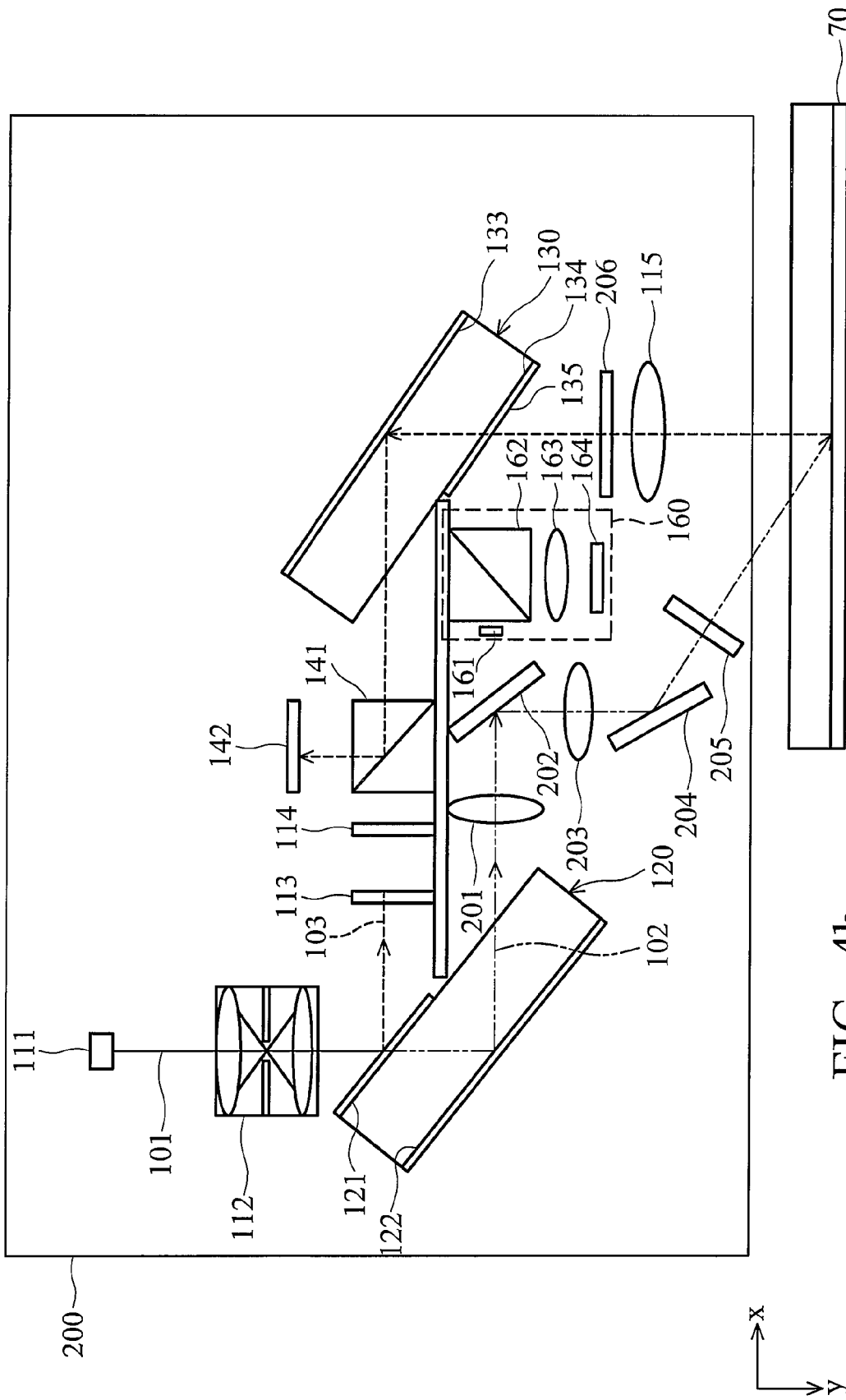
FIG. 4b shows the holographic data storage system of the third embodiment reading data from the optical medium.
Figure 4C:
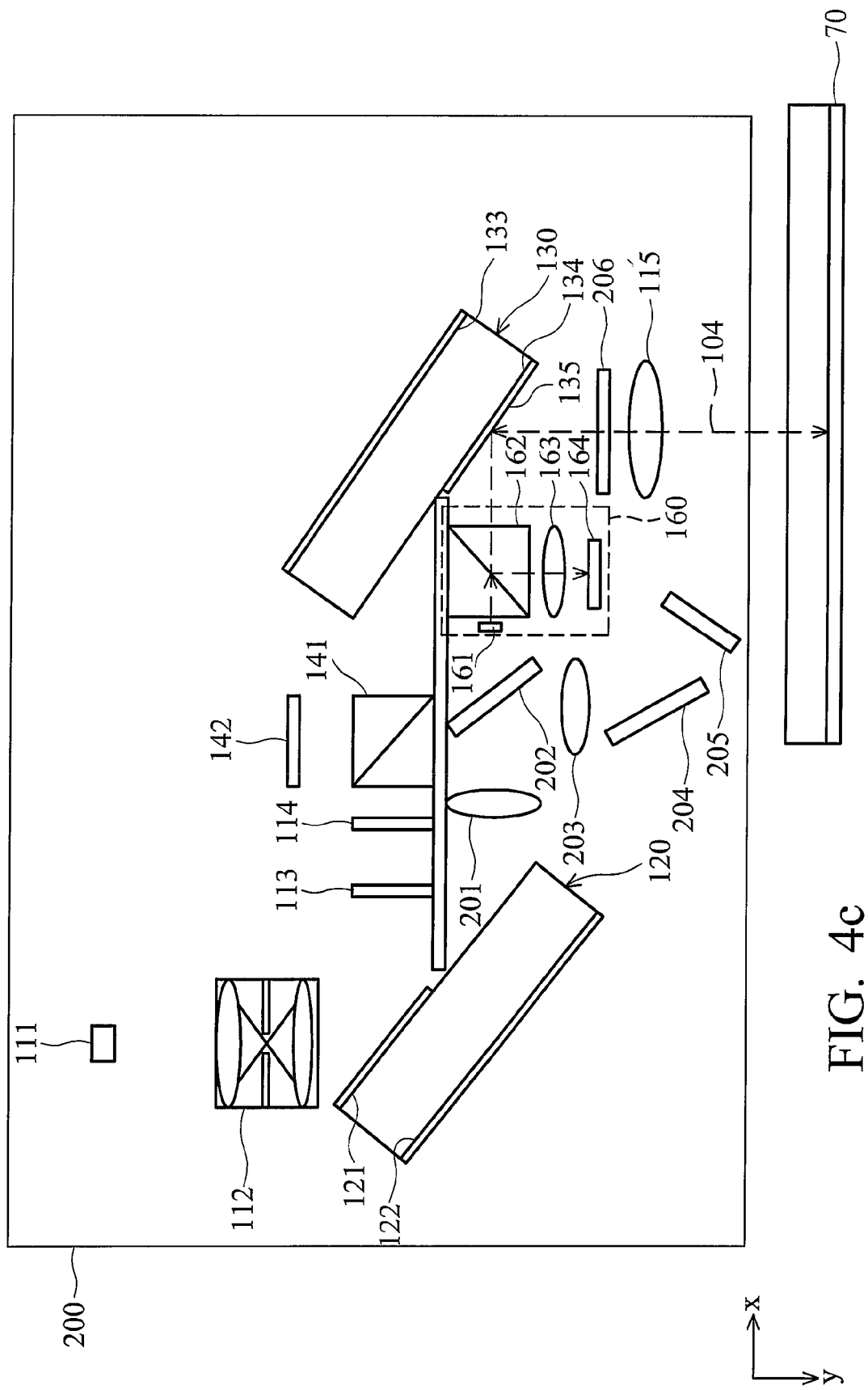
FIG. 4c shows the holographic data storage system of the third embodiment performing a servo process.

The first and the second embodiments are on axis holographic data storage systems. FIGS. 4a-4c show a holographic data storage system 200 of a third embodiment of the invention, which is an off axis holographic data storage system. As shown in FIG. 4a, in the third embodiment, the initial light beam 101 is partially reflected on the first surface 121 to act as a signal beam 103. The initial light beam 101 partially passes the first surface 121, and is reflected on the second surface 122 to act as a reference beam 102. The signal beam 103 passes the shutter 113, the light modulator 114 and the beam splitter 141, reflected on the third surface 133, and passing a ¼ wave plate 206 and the lens 115 to the optical medium 70. The reference beam 102 passes a lens 201, a reflector 202, a lens 203, and reflector 204 and a ¼ wave plate 205 toward the optical medium 70. The reference beam 102 and the signal beam 103 interfere with each other to store the pattern into the optical medium 70. The light path of the reference beam 102 can be modified by rotating the reflectors 202 and 204.

As shown in FIG. 4b, when the holographic data storage system 200 reads the optical medium 70, the signal beam 103 stopped by the shutter 113. The reference beam 102 contacts the optical medium 70 at a preset angle, recovering the data pattern stored therein, reflected toward the third surface 133, reflected by the third surface 133 toward the beam splitter 141, and guided to the image sensor 142 by the beam splitter 141. Thus, the data pattern is received by the image sensor 142.

Figure 5:
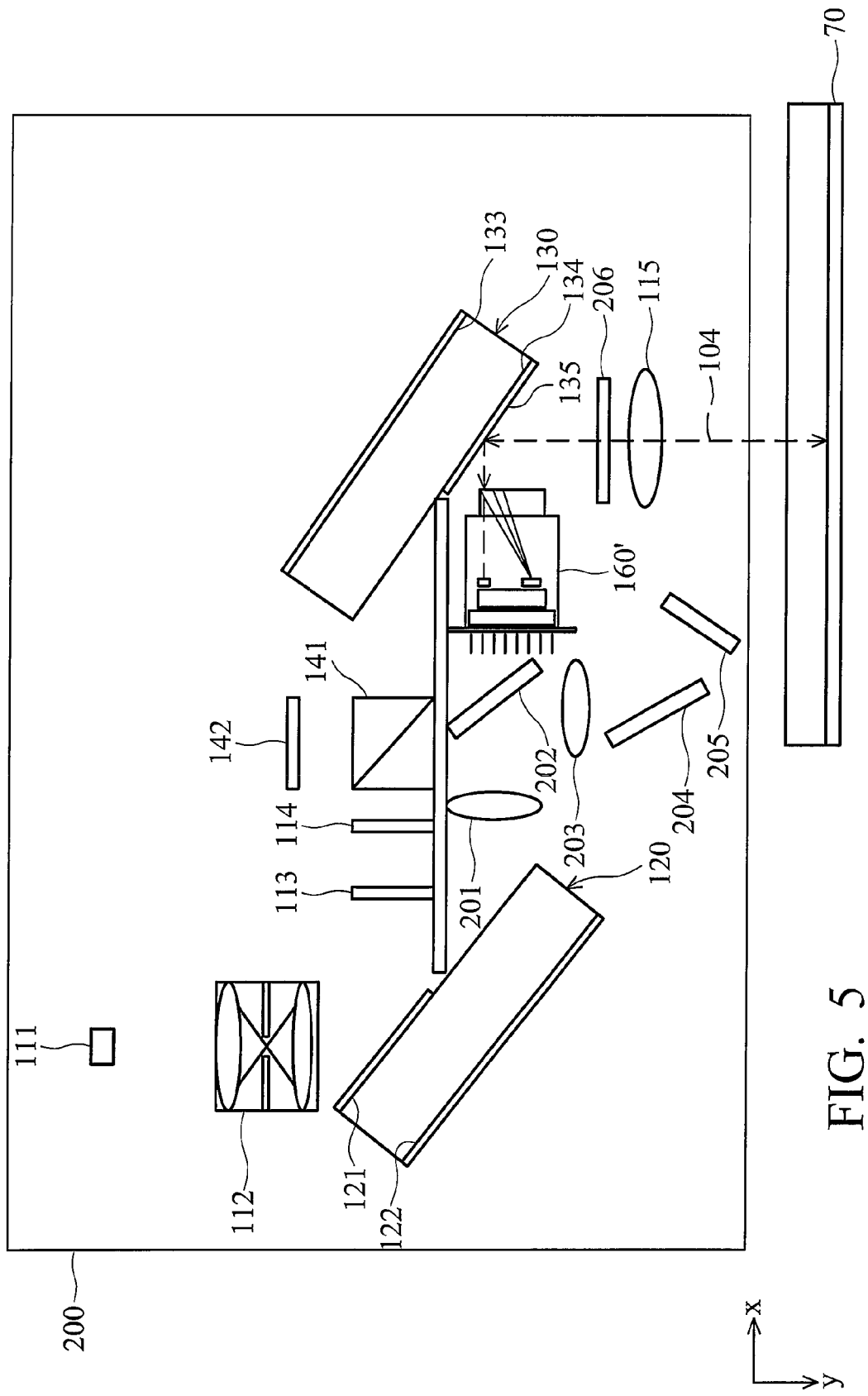
FIG. 5 shows a modified example of the third embodiment.

As shown in FIG. 4c, the servo unit 160 is a common servo unit, comprising a servo light source 161, a beam splitter 162, a lens 163 and an optical sensor 164. When the holographic data storage system 200 performs a servo process, the servo light source 161 provides a servo light beam 104, passing the beam splitter 162, reflected by the fourth surface 134, passing the ¼ wave plate 206, the lens 115 to be modulated and is reflected by the servo grooves of the optical medium 70. Then, the servo light beam 104 travels along its original path back to the servo unit 160, passing the beam splitter 152 and lens 163, reflected by the fourth surface 134 and the beam splitter 162, passing the lens 163, and received by the optical sensor 164. The holographic data storage system 200 performs the focus servo and seek servo by the servo unit 160. Additionally, as shown in FIG. 5, the servo unit 160 can be replaced by a holographic servo unit 160'.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical storage system for storing data in an optical medium, comprising:
   an initial light source, providing an initial light beam;
   a first sheet, comprising a first surface and a second surface, arranged such that the initial light beam is partially reflected on the first surface to act as a reference beam, and the initial light beam partially passes the first surface and is reflected on the second surface to act as a signal beam;
   a light modulator, providing a pattern, wherein the signal beam contacts the light modulator; and
   a second sheet, comprising a third surface and a fourth surface, wherein the reference beam is reflected toward the optical medium on the third surface, the signal beam is reflected toward the optical medium on the fourth surface, and the reference beam and the signal beam interfere with each other to store the pattern into the optical medium, wherein the first sheet is parallel to the second sheet, and the reference beam and the signal beam travel in parallel between the first and second sheets.

2. The optical storage system as claimed in claim 1, wherein the initial light beam travels in a first direction, the reference beam and the signal beam travel in a second direction after reflection on the first sheet, and the first direction is perpendicular to the second direction.

3. The optical storage system as claimed in claim 2, wherein an included angle between the first sheet and the first direction is 45°.

4. The optical storage system as claimed in claim 2, wherein the reference beam and the signal beam are reflected on the second sheet, and travel in the first direction.

5. The optical storage system as claimed in claim 1, wherein the first sheet further comprises a first optical film and a first reflective layer, the first optical film is formed on the first surface, and the first reflective layer is formed on the second surface.

6. The optical storage system as claimed in claim 5, wherein the initial light beam is partially reflected by the first optical film to act as the reference beam, and the initial light beam partially passes the first optical film, reflected by the first reflective layer to act as the signal beam.

7. The optical storage system as claimed in claim 5, wherein the first optical film is partially formed on the first surface.

8. The optical storage system as claimed in claim 1, wherein the second sheet further comprises a second optical film and a second reflective layer, the second optical film is formed on the fourth surface, and the second reflective layer is formed on the third surface.

9. The optical storage system as claimed in claim 8, wherein the reference beam is reflected toward the optical medium by the second reflective layer, the signal beam is reflected toward the optical medium by the second optical film, and the reference beam and the signal beam interfere with each other to store the pattern into the optical medium.

10. The optical storage system as claimed in claim 5, wherein the second optical film is partially formed of the fourth surface.

11. The optical storage system as claimed in claim 1, wherein the light modulator is disposed between the first and the second sheets, and the signal beam is reflected on the second surface, passing the light modulator and is reflected on the fourth surface.

12. The optical storage system as claimed in claim 1, wherein the light modulator is a micromirror element.

13. The optical storage system as claimed in claim 12, wherein the light modulator is disposed on the second surface, and the signal beam passes the first surface, modulated by the light modulator and is reflected thereby.

14. The optical storage system as claimed in claim 1, further comprising a shutter, a beam splitter and an image sensor, wherein when the optical storage system reads the optical medium, the signal beam is stopped by the shutter, and the reference beam contacts the optical medium, reflected toward the fourth surface, reflected by the fourth surface into the beam splitter, and guided toward the image sensor.

15. The optical storage system as claimed in claim 1, further comprising a servo light source, an optical sensor, a holographic optical element and a dichroic mirror, wherein when the optical storage system performs a servo process, the servo light source provides a servo light beam, and the servo light beam is reflected by the dichroic mirror and the third surface to the optical medium, traveling along its original path back to the holographic optical element after contacting the optical medium, and is guided by the holographic optical element toward the optical sensor.

16. An optical storage system for storing data in an optical medium, comprising:
   an initial light source, providing an initial light beam;
   a first sheet, comprising a first surface and a second surface, arranged such that the initial light beam is partially reflected on the first surface to act as a signal beam, and the initial light beam partially passes the first surface and is reflected on the second surface to act as a reference beam;
   a light modulator, providing a pattern, wherein the signal beam contacts the light modulator;
   a second sheet, reflecting the signal beam toward the optical medium, wherein the first sheet is parallel to the second sheet, and the reference beam and the signal beam travel in parallel between the first and second sheets; and
   at least one reflector, reflecting the reference beam toward the optical medium, where the reference beam and the signal beam interfere with each other to store the pattern into the optical medium.

* * * * *